United States Patent Office 3,451,082
Patented June 24, 1969

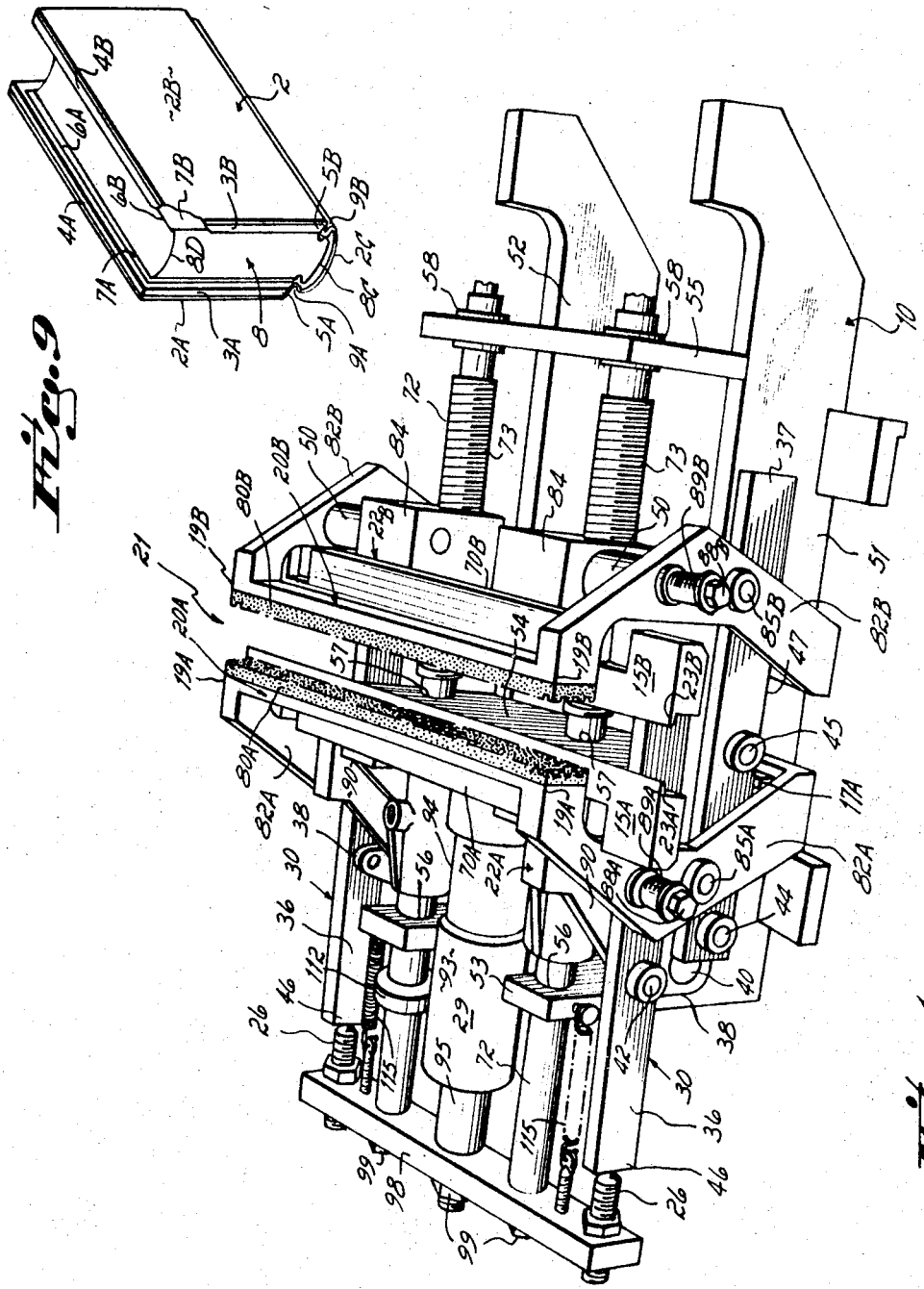

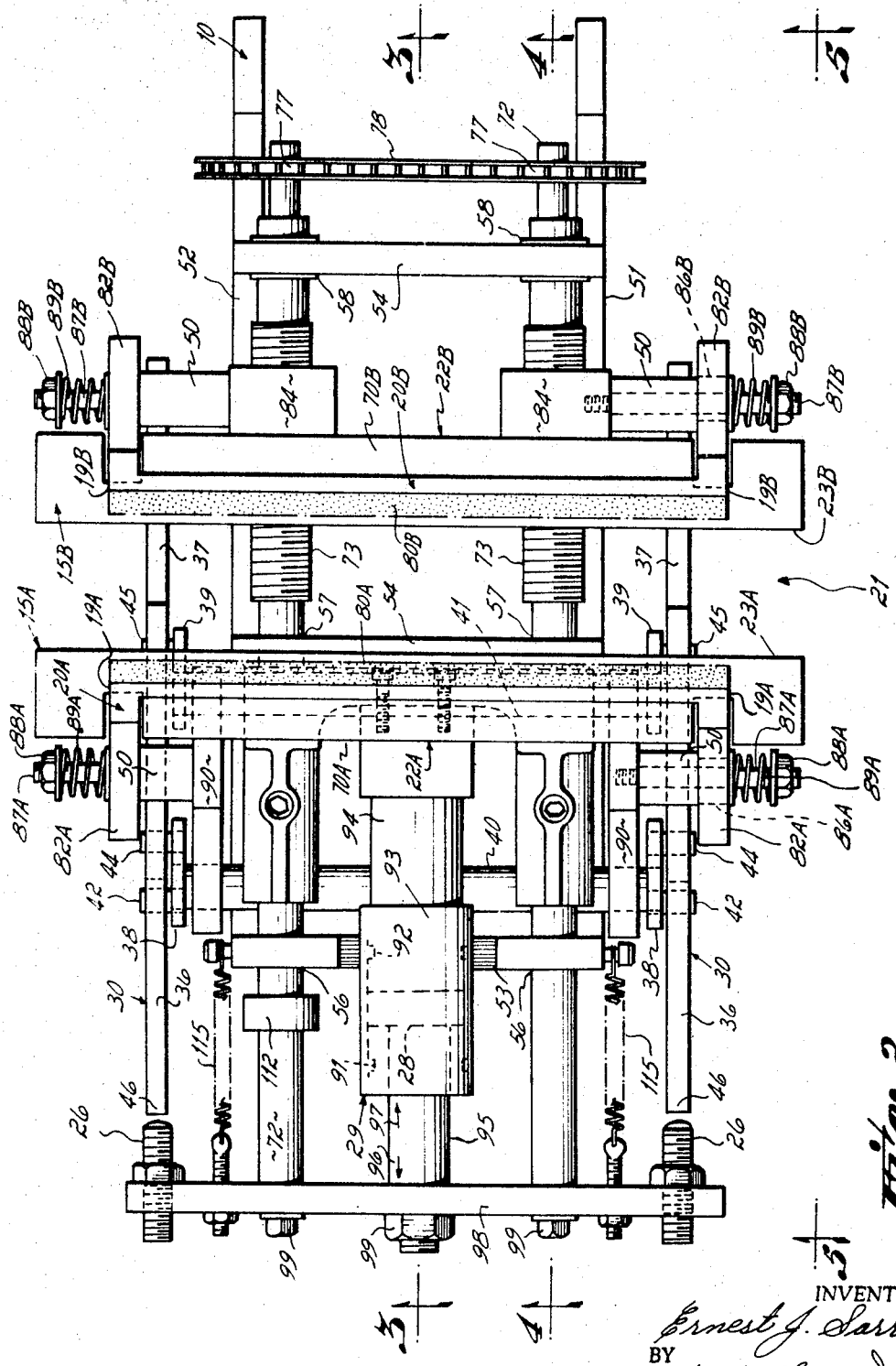

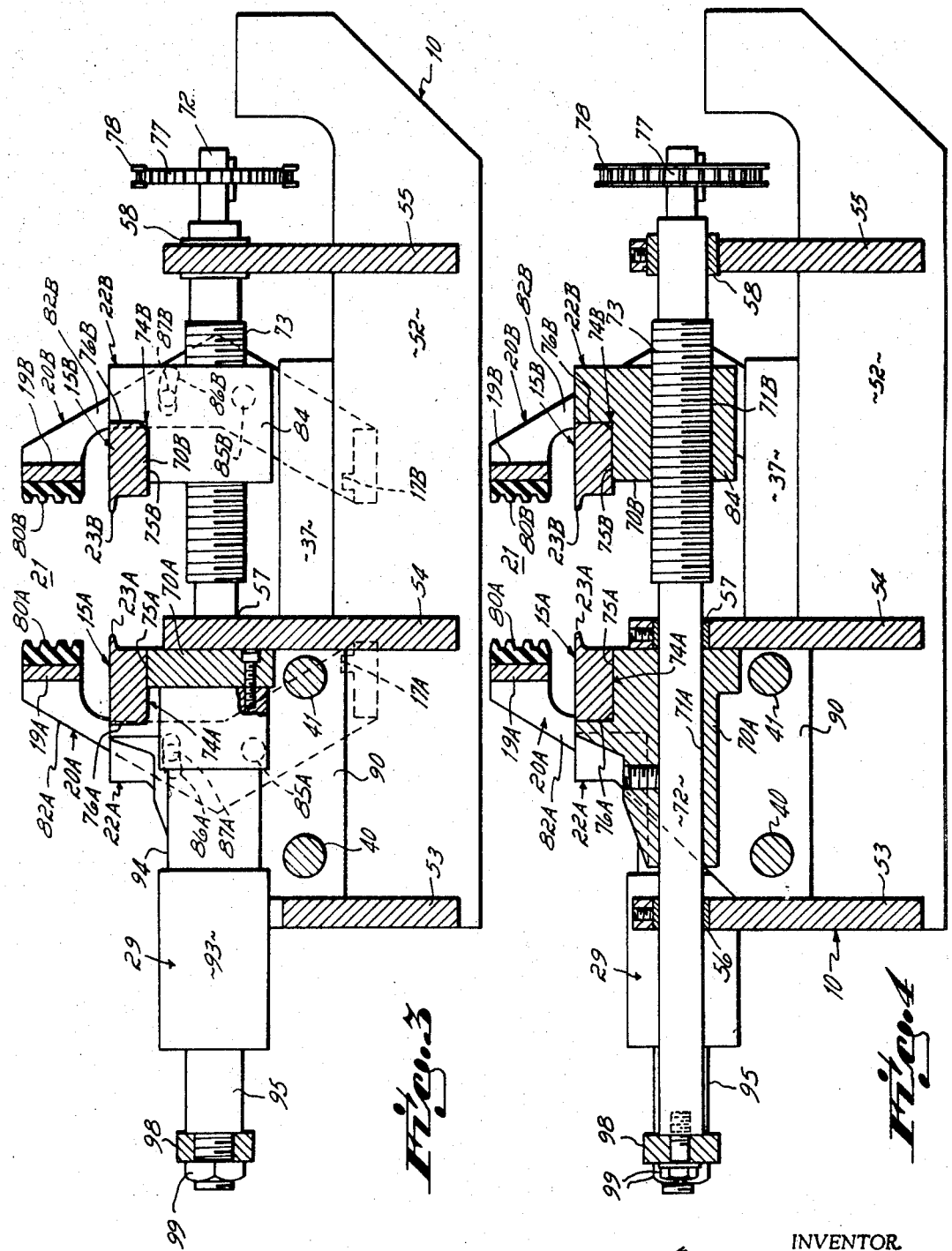

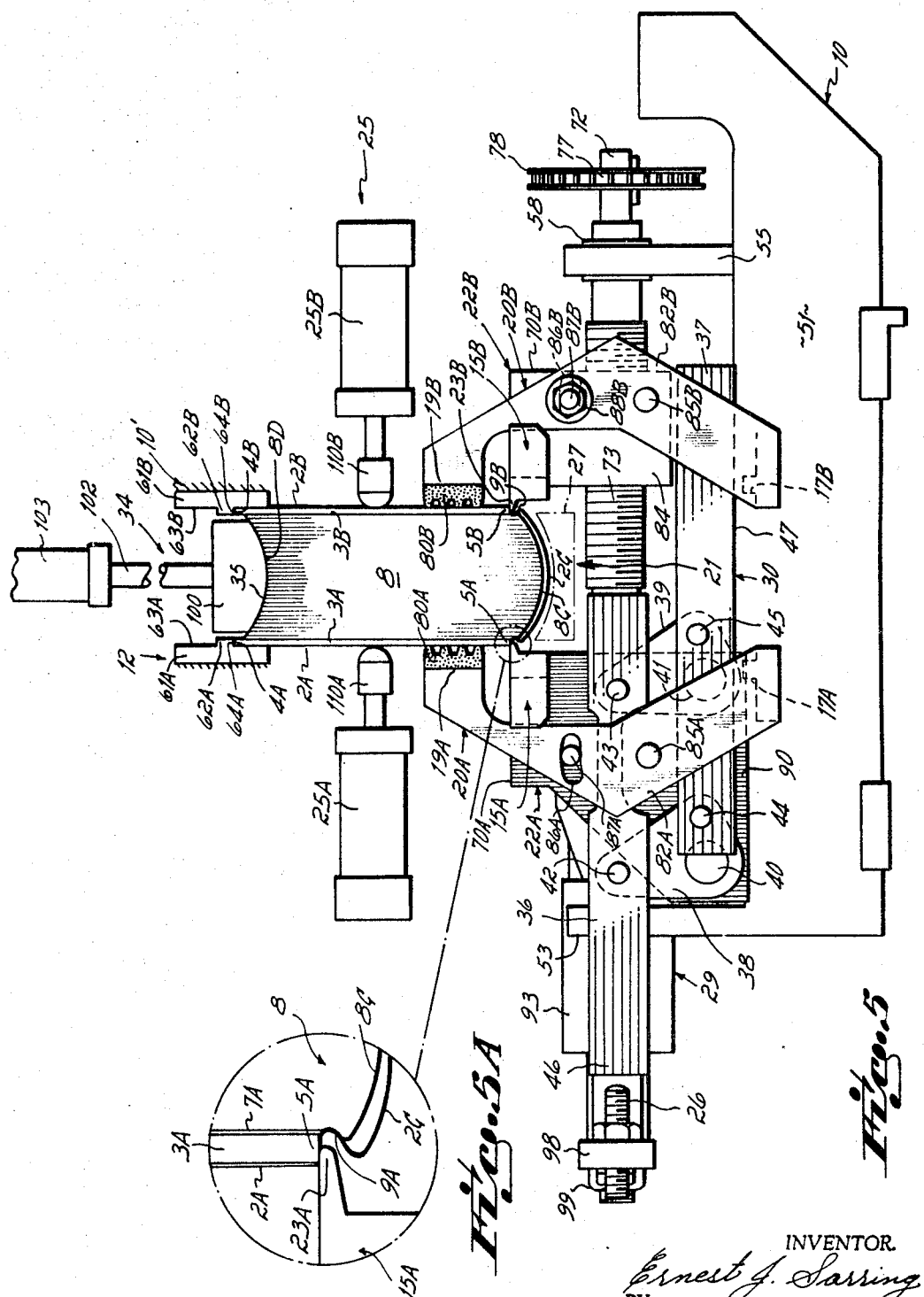

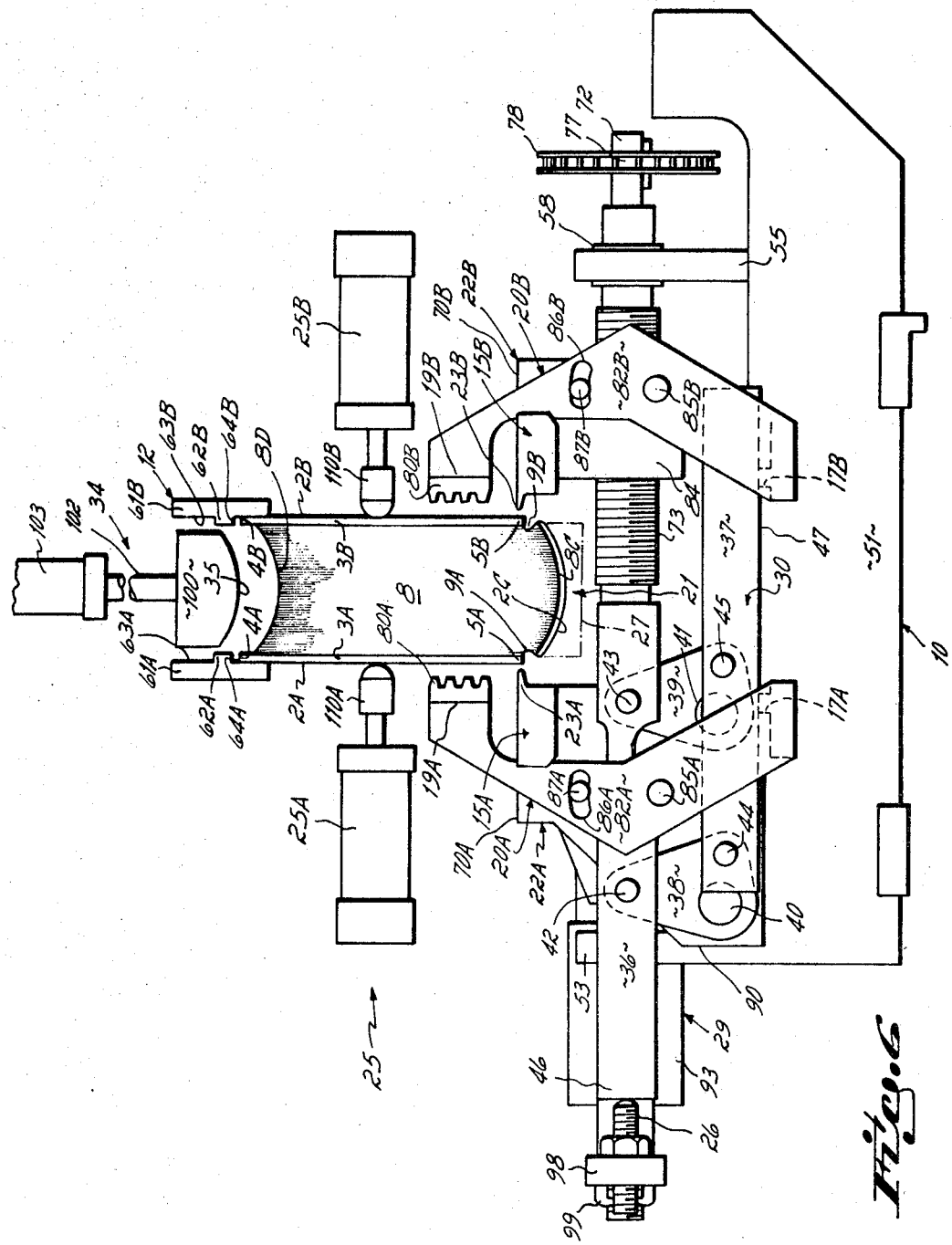

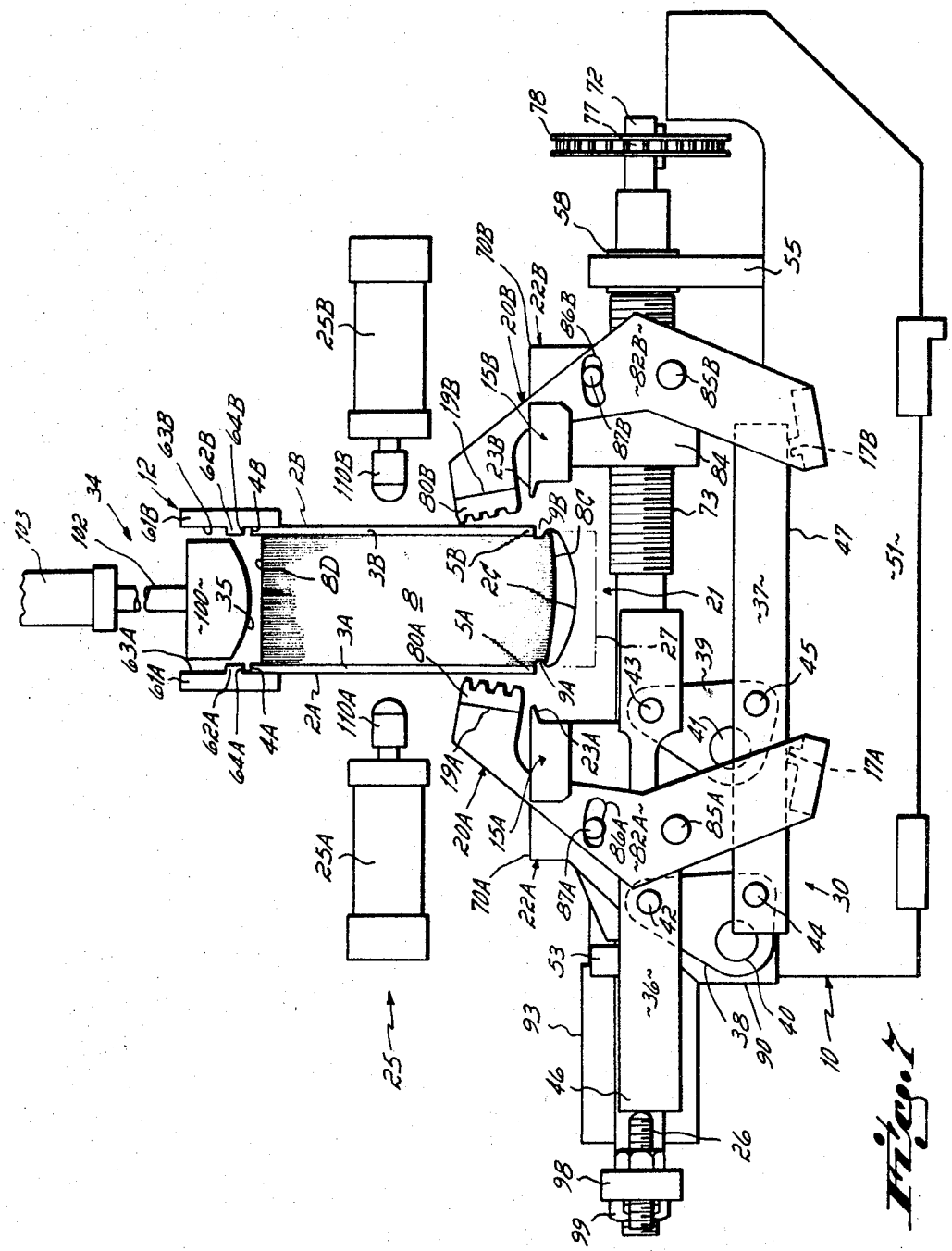

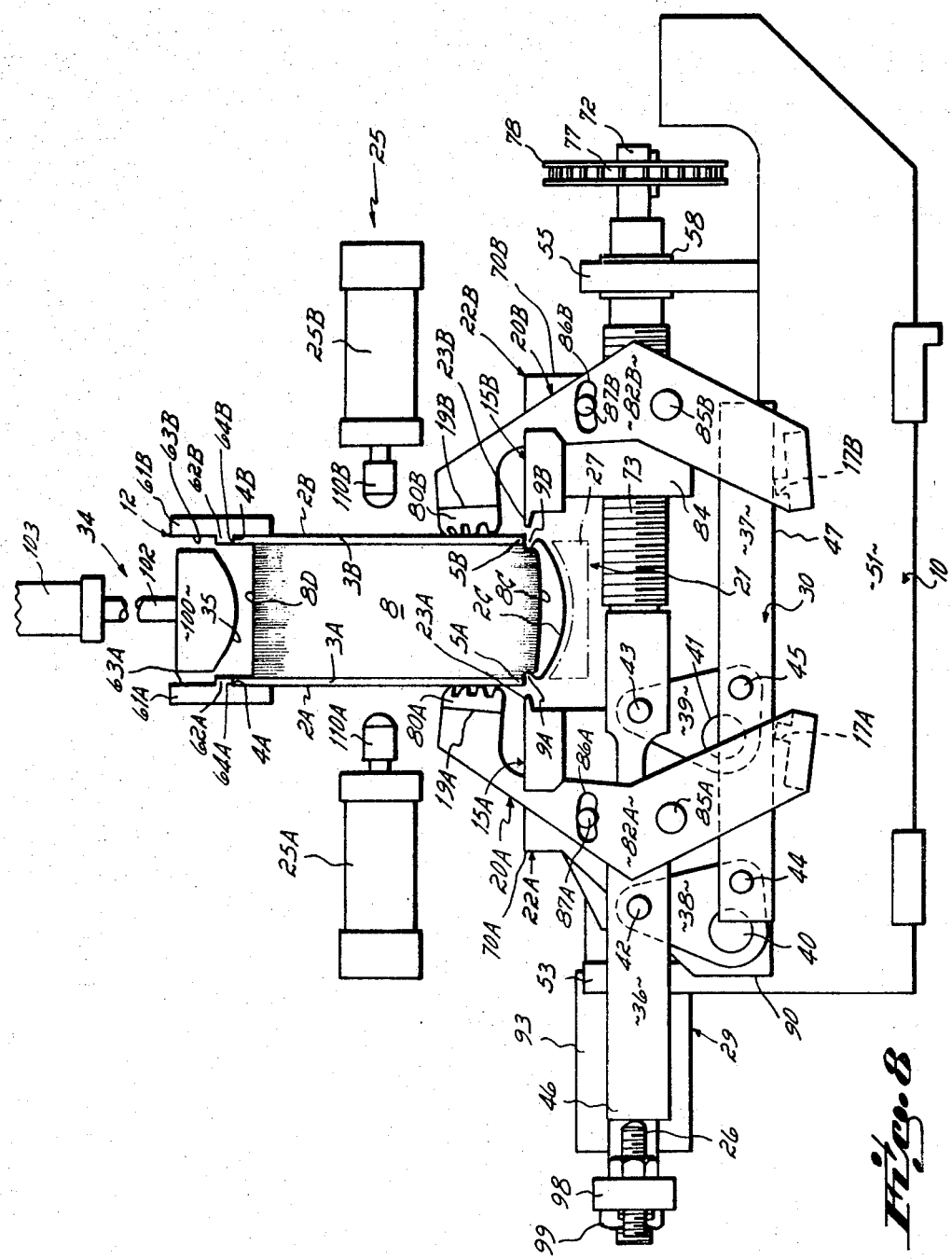

3,451,082
METHOD AND APPARATUS FOR PROPERLY POSITIONING A BOOK WITHIN A CASE
Ernest J. Sarring, Fort Thomas, Ky., assignor to Crawley Machinery Co., Newport, Ky., a corporation of Ohio
Filed Jan. 23, 1968, Ser. No. 699,876
Int. Cl. B42c 11/04
U.S. Cl. 11—3          15 Claims

ABSTRACT OF THE DISCLOSURE

A method for squarely positioning a book between the boards of a case including the steps of gripping the ends of the case between which is sandwiched a book having its end sheets freshly glued, advancing the encased book toward a stationary abutment to bring the front edges of the boards into contact with a locating surface, and maintaining the front board edges in contact with the locating surface while urging the front of the encased book toward the case back to eliminate any anti-parallelism between the front edges of the book end sheets and the front edges of the boards and thereby squarely position the book within the case. Apparatus for practicing the foregoing method, including an abutment having a locating surface thereon engageable with the front edges of the boards, a board holder for positioning and holding the boards with their front edges in contact with the abutment locating surface, and a ram having a book front engaging surface disposed parallel to the abutment locating surface and movable away from the abutment toward the back of the book for positioning the book squarely within the case with the front book edges parallel to the front board edges.

---

This invention relates to apparatus and methods of book binding, and more particularly to apparatus and methods of positioning an encased book with freshly glued end sheets squarely relative to the boards of the case with the front of the book parallel to the front edges of the boards.

In the following description of the structure and operation of the disclosed invention, the term "book" as used herein defines a plurality of signatures, each having one or more sheets or pages, which are sewn or stitched or otherwise fastened together along a common edge termed the "backbone edge." The term "front edge" of the book as used herein defines the edge of the book which is opposite and parallel to the backbone edge. The term "end sheet" of the book as used herein defines the outermost page of the book at each end thereof. The term "board" as used herein defines the sheet-like stiff material positioned exteriorly of and adjacent to each end sheet of the book, and which in practice is glued thereto. The boards, like the book, have a front edge and a backbone edge. The term "case" as used herein defines the combination of boards and the material or fabric adhered to and covering the exterior surfaces of the boards. The case also includes a central portion or "back" which covers the back of the book and interconnects the boards at their backbone edges. The term "hinge" as used herein defines the indentation in the case and in the book parallel to and between the board and book backbone edges and the case and book backs.

In a typical book binding operation the signatures, after having been stitched or sewn to form a book, are subjected to what is termed a "casing-in" step. The casing-in step involves applying glue to the outer surfaces of the end sheets of the book and inserting the freshly glued book between the boards of a case. Subsequent to the casing-in step, the assembled book and case are, while the glue is yet unset, typically subjected to a further step known as "building-in." The building-in step among other things involves applying external pressure perpendicularly to the boards to compress the boards against the freshly glued end sheets of the book, and functions to secure a satisfactory bond between the book end sheets and the boards.

In practice, it has been found desirable intermediate the casing-in and building-in steps of the book binding process to "square" the book in the case, that is, to eliminate any anti-parallelism or skew between the front edges of the book and the front edges of the boards which may exist following the casing-in step. The elimination of such anti-parallelism, in addition to its inherent function of properly locating a book within its case, also functions to produce two further and equally important results. Namely, the squaring step, by sliding the book within the case, serves to evenly distribute the glue that has been applied to the outer surfaces of the end sheets of the book during the casing-in step, thereby enhancing adhesion of the book and case. Frequently, when the glue is applied to the end sheets during the casing-in step, serrated or knurled applicators are used, resulting in the deposit of an uneven or ridged glue film on the end sheets. The squaring step corrects this by evenly distributing the glue. A further function of the squaring step, useful in the binding of "tight back" books, that is, books having their backs adhered to the back of the case, is to urge the book back which has glue applied thereto into contact with the back of the case. This further enhances the adhesion of the book and case.

In approximately ninety percent of book binding operations where a squaring step has been proposed, the elimination of anti-parallelism between the book and board front edges is carried out manually by assembly line personnel as they transfer encased and freshly glued books from the casing-in machine to the building-in machine. In the proposed manual squaring step the operator urges the book into the case with the index fingers of each hand while he grasps the encased book between his thumbs and the last three fingers of each hand. Specifically, the thumbs are placed in contact with the upper corners of the one board adjacent the front edge thereof while the last three fingers of each hand are placed on the corners of the other board opposite the thumbs.

Manual squaring of books is haphazard, imprecise and generally unreliable by reason of the fact that the extent of pressure applied to the book front by the index fingers, as well as the degree of travel of each of the index fingers in the direction of the book back, are frequently different for each hand. This gives rise to uneven insertion of the book in the direction of the casing back, which in turn causes skewness or anti-parallelism to exist between the book and board front edges.

Another prior art proposal for squaring an encased book relative to the boards, which has not received widespread acceptance, is the "press-down" method. In accordance with this proposal an encased, freshly glued book is delivered from the casing-in machine to a press-down station where it is deposited upon its backbone with the back of the casing in contact with a horizontal support plate and the book and boards disposed in a generally perpendicular direction to the support plates. Subsequent to delivery of the book to the press-down station, a vertically reciprocable press-down bar is lowered into contact with the front of the book, and urges the book downwardly.

The disadvantage of the press-down method is twofold. First, when the book is deposited on the support plate, if it is of the sewn type, the round is often destroyed as the back of the book conforms to the flat or otherwise unmatched contour of the support plate. Secondly, the press-down method provides no assurance that the front edges of the book are disposed parallel to the front edges of the boards. While the press-down bar is disposed parallel to the support plate and, hence, the front edges of the book positioned in a plane parallel to the book back, the boards are free to assume any orientation during the press-down operation and may assume a position in which their front edges are not parallel to the front of the book.

A still further prior art squaring method has been proposed. In accordance with this proposal, the press-down method is supplemented to the extent that during the press-down method, prior to actuation of the press-down bar, nipper jaws are introduced into the hinges of the encased book which rests at the press-down station with its back on the support plate. The nipper jaws presumably prevent the boards from moving downwardly when the press-down bar is actuated. If an encased book is initially positioned on the support plate with its hinges in alignment with the nipper jaws, the downward movement of the press-down bar theoretically produces parallelism between the front edges of the book and the front edges of the boards, inasmuch as the downward motion of the book urges the backbone edges of the boards into contact with the inserted nipper jaws which are parallel to the press-down bar.

The disadvantage of the above proposal is that while it may produce proper squaring in a certain number of cases, under certain circumstances, namely, when a book is deposited with its hinges parallel to the nipper jaws, it does not produce such results consistently or reliably. Since the initial existence of parallelism between the hinges and the nipper jaws is a chance occurrence, the production of a properly squared book with its front parallel to the front board edges, is also a chance occurrence, and as such, is inherently unreliable.

For example, if the book is deposited at the press-down station with its hinges substantially below the nipper jaws, when the nipper jaws advance toward the encased book they strike the case at a point above the hinge, specifically in the marginal portion of the boards adjacent to the backbone edges. When the press-down bar thereafter urges the encased book further into the case, the boards, which may or may not have their backbone edges parallel to the support plate, remain stationary. Should the backbone edges of the stationary boards not be parallel to the support plate, the front of the book, which is parallel to the support plate by reason of the parallel disposition of the press-down bar relative to the nipper jaw, ends up skewed relative to the front edges of the boards.

It has been a principal objective of this invention to produce a method and apparatus for consistently and reliably positioning a book squarely within a case with the front edges of the boards and book parallel. This objective has been accomplished in accordance with the principles of this invention by adopting a fundamentally different approach to the squaring of an encased book in which the front edges of the boards which encase the book are maintained in intimate contact with a locating surface disposed parallel to the book front engaging surface of a press-down bar, ram or squaring bar as the squaring bar moves against the book front, driving the hook further into the case.

In accordance with a preferred form of this invention, a stationary abutment is provided having a locating surface adapted to be contacted by the front edges of the boards of a case in which a freshly glued book is positioned. Engagement of the front board edges with the locating surface of the abutment is effective to locate the backbone edges of the boards at a predetermined reference position to which a pair of inwardly movable position maintaining jaws are adapted to be advanced for the purpose of applying a restraining force to the board backbone edges. The restraining force maintains the front edges of the boards in contact with the locating surface of the abutment while the squaring bar, ram, or press-down bar is urged downwardly to drive the book further into the case. By reason of the parallel relationship between the locating surface of the abutment, against which the front edges of the board are maintained by the restraining force of the jaws, and the book front engaging surface of the squaring bar, which contacts the book and urges it further into the case, the front edges of the book including the end sheets are left in a condition of parallelism with respect to the front edges of the boards.

It has been a further objective of this invention to provide apparatus for squaring a book with respect to its case, which is extremely simple in structure and operation but yet is reliable and accurate. This objective has been accomplished in accordance with additional principles of this invention by providing unique positioning means for gripping the boards of a case and urging them toward the abutment to bring their front edges into contact with the locating surface thereof. This positioning means includes a pair of gripping jaws mounted on the position maintaining jaws for limited pivotal movement between an initial position wherein the gripping jaws are inboard of their associated position maintaining jaws, and a gripping position wherein said gripping jaws are both outboard of their associated position maintaining jaws and spaced more closely to the abutment locating surface.

In operation, when the position maintaining jaws are moved toward the boards the gripping jaws, which are pivoted to their inner most position, engage the boards. As the position maintaining jaws continue their inward movement, the gripping jaws pivot, moving outwardly and upwardly relative to the position maintaining jaws. This pivotal gripping jaw movement simultaneously grips the encased book, as well as urges it upwardly to bring the front board edges thereof into contact with the abutment locating surface. Concurrently with the movement of the front board edges into contact with the locating surface of the abutment, the position maintaining jaws move into their final operative position adjacent and below the backbone edges of the boards. While the position maintaining jaws are operatively positioned, applying a restraining force to the boards and maintaining the front edges thereof in contact with the locating surface, the squaring bar moves downwardly to square the book. Upon completion of the squaring operation, the squaring bar is elevated and the position maintaining jaws retracted to their outer position.

It has been a further objective of this invention to provide squaring apparatus which permits removal of a squared book from the squaring station to commence substantially simultaneously with retraction of the position maintaining jaws, thereby speeding up the squaring cycle. This objective has been achieved by providing a slip friction connection between the pivotal gripping jaws and the position maintaining jaws. This slip friction connection prevents the gripper jaws from pivoting downwardly, remaining in contact with the encased book, upon retraction of the position maintaining jaws. Thus, as the position maintaining jaws retract, the gripper jaws also retract, enabling immediate removal of the squared book.

If the gripping jaws are not pivotally frictionally connected, when the position maintaining jaws are retracted, the gripping jaws have a tendency to return to their initial position, moving inwardly and downwardly. This delays the point at which the griping jaws lose contact with the boards, in turn delaying the removal of the squared book. In adition, return of the gripping jaws to their initial position while still in contact with the boards causes the encased book to be driven downwardly. This moves the book back against the book supporting plate, destroying the round.

It has been another objective of this invention to provide simplified means for resetting the gripping jaws to their innermost inoperative position subsequent to each squaring cycle to ready the apparatus for the subsequent squaring operation. This objective has been accomplished in accordance with certain further principles of this invention by providing a parallel linkage mechanism mounted on one of the position maintaining jaws which cooperates with stops mounted on the other position maintaining jaw. The parallel linkage mechanism has a pair of bars which move in parallel in a downward direction when the position maintaining jaws move outwardly upon the completion of the squaring operation. The downward travel of the bars in turn drives downwardly a second set of stops formed on the pivotal gripping jaws, pivoting them into their inoperative position, and thereby resetting them.

One of the principal advantages of the novel gripping jaw resetting mechanism described above is that, because it is susceptible of being mounted in its entirety on one of the position maintaining jaws, it permits the other position maintaining jaw to be adjusted inwardly or outwardly to accommodate different thickness books without altering the coaction of the parallel link mechanism and the stops on the gripping jaws. Thus, the resetting mechanism is rendered substantially independent of the position of the position maintaining jaws, permitting the spread between the position maintaining jaws to be varied for different size books without adjusting the gripping jaw resetting mechanism.

Certain other additional objectives and advantages of this invention will become apparent from a detailed description of the drawings of the preferred embodiment in which:

FIGURE 1 is a perspective of a preferred embodiment of this invention.

FIGURE 2 is a top plan view of the preferred embodiment of this invention.

FIGURE 3 is a cross-sectional view taken along lines 3—3 of FIGURE 2.

FIGURE 4 is a cross-sectional view taken along lines 4—4 of FIGURE 2.

FIGURE 5 is an elevational view taken along lines 5—5 of FIGURE 2, showing the relationship of the various components at a point in the squaring cycle when the gripping jaws and position maintaining jaws are in their operative positions with the front edges of the boards in contact with the locating surface, and the ram in its downward travel position to round and square the book within the case.

FIGURE 5A is an enlarged view of the lip of the position maintaining jaw and the backbone edge of the board, showing their orientation when the position maintaining jaw is in its operative position.

FIGURE 6 is a front elevational view of the preferred embodiment of this invention showing the relationship of the various components thereof at a point in the squaring cycle subsequent to squaring the book and prior to its removal from the work station.

FIGURE 7 is a front elevational view of the preferred embodiment of this invention, showing the relationship of the various components thereof at a point in the squaring cycle when a freshly glued encased book is delivered to the work station.

FIGURE 8 is a front elevational view of the preferred embodimnet of this invention, showing the relationship of the various components thereof at a point in the squaring cycle when the gripping jaws have just gripped the boards of an encased book located at the work station in the course of their inward travel.

FIGURE 9 is a perspective of an encased book showing its various components, principal edges, and faces.

*General description*

An encased book, as output from a casing-in machine, upon which the apparatus and methods of this invention are adapted to operate is depicted in FIGURE 9. Referring to FIGURE 9, an encased book is seen to include a case 2 divided into end portions 2A and 2B and a central back portion 2C, the back portion 2C being separated from the end portions 2A and 2B by hinge portions 9A and 9B, respectively. Secured to the inside surface of the case ends 2A and 2B are boards 3A and 3B having front edges 4A and 4B and backbone edges 5A and 5B. Positioned between the boards 3A and 3B is a book 8 comprising a plurality of signatures having backbone edges 8C fastened together in any one of a variety of manners well known in the art, and unfastened front edges 8D. The book 8 has end sheets 7A and 7B which are adapted to have their outer surfaces glued to the inner surfaces of the boards 3A and 3B, respectively. The function of the apparatus of this invention is to position the encased book 8 having freshly glued end sheets 7A and 7B squarely within the case 2, with the front edges 6A and 6B of the end sheets 7A and 7B parallel to the front edges 4A and 4B of the boards 3A and 3B.

As shown in FIGURES 1–5, a preferred form of the squaring apparatus of this invention includes a frame, generally indicated by the reference numeral 10 which is dimensioned and configured to operatively support the various components of the squaring apparatus in the different positions which they assume in a squaring cycle. Secured to the frame 10 is a stationary abutment 12 provided with appropriate locating surfaces 64A and 64B thereon. The front edges 4A and 4B of the boards 3A and 3B, between which a book 8 to be squared is sandwiched, are adapted to contact the locating surfaces 64A and 64B of abutment 12 for the purpose of locating at predetermined reference positions the backbone edges 5A and 5B.

A pair of board positioning means or gripper jaw assemblies 20A and 20B are disposed on opposite sides of a work station generally indicated by the reference numeral 21. The gripper jaw assemblies 20A and 20B include jaws 19A and 19B which are selectively movable inwardly and upwardly for gripping therebetween the boards 3A and 3B of a book positioned at the work station 21 and thereafter elevating them upwardly to bring the front board edges 4A and 4B into contact with the locating surfaces 64A and 64B of the abutment 12.

A pair of board restraining or position maintaining assemblies 22A and 22B having lips 23A and 23B are provided to restrain downward movement of the boards 3A and 3B once positioned with their front edges 4A and 4B in contact with the locating surface 64A and 64B of the abutment 12. An actuator generally indicated by the reference numeral 29 interconnects the board restraining assemblies 22A and 22B for selectively reciprocating the board restraining assemblies between an outer inoperative position wherein their lips 23A and 23B are laterally displaced from the backbone edges 5A and 5B of the boards 3A and 3B of the encased book 8 positioned at the work station 21, and an inner operative position wherein their lips are positioned adjacent and beneath the backbone edges of the boards for applying a restraining force to the boards 3A and 3B at their backbone edges to maintain the board front edges 4A and 4B in contact with the abutment locating surface 64A and 64B.

The gripping jaw assemblies 20A and 20B are mounted, respectively, to the board restraining assemblies 22A and 22B for limited pivotal movement between an outer inoperative position in which the gripping jaws 19A and 19B are inboard of the lips 23A and 23B of their associated board restraining assemblies 22A and 22B (FIGURE 7) and an inner operative position in which the gripping jaws are outboard of their associated lips 23A and 23B as well as spaced above the positions they occupy when inoperative. The gripping jaw assemblies 20A and 20B are operatively positioned by inward movement of the board restraining assemblies 22A and 22B upon which they are mounted. The gripping jaw assemblies 20A and 20B are reset to their inoperative positions by a pair of parallel motion assemblies generally indicated by the reference numerals 30—30 which pivot the gripping jaw assemblies when the board restraining assemblies 22A and 22B are outwardly shifted to their inoperative position.

A ram generally indicated by the reference numeral 34 having a book front engaging surface 35 disposed parallel to the lips 23A and 23B and the abutment locating surface 64 is provided for urging downwardly a book 8 sandwiched between a pair of properly positioned boards 3A and 3B thereby positioning the front edges 8D of the book parallel to the front edges 4A and 4B of the boards.

In operation, a book with its end sheets 7A and 7B freshly glued and inserted between the boards 3A and 3B of a case 2 is transported in a horizontal path to the work station 21 where it is deposited with its back 2C lowermost and resting on a back support 27, and its front uppermost. The actuator 29 is then operated to urge the board restraining assemblies 22A and 22B and the gripping jaw assemblies 20A and 20B mounted thereon, which are both in their outer inoperative positions, toward their inner operative positions. Since the gripping jaws 19A and 19B are inboard of the lips 23A and 23B, as the board restraining assemblies 22A and 22B and gripping jaw assemblies 20A and 20B move inwardly the gripping jaws 19A and 19B abut the boards 3A and 3B before the lips 23A and 23B enter the hinges 9A and 9B.

As the board restraining assemblies 22A and 22B continue to move inwardly to their operative position, the gripping jaws 19A and 19B move outwardly and upwardly elevating the encased book 8 and urging the front edges 4A and 4B of the boards 3A and 3B into contact with the locating surfaces 64A and 64B of the abutment 12, which in turn aligns the backbone edges 5A and 5B of the boards with the upper surfaces of the lips 23A and 23B. When the front board edges 4A and 4B have contacted the locating surfaces 64A and 64B of the abutment 12 and the backbone edges 5A and 5B are aligned with the upper surface of the lips 23A and 23B further inward motion of the board restraining assemblies 22A and 22B is effective to position the lips 23A and 23B adjacent and beneath the backbone edges 5A and 5B of the boards. This applies a restraining force to the boards 3A and 3B for maintaining them positioned with their front edges 4A and 4B in contact with the locating surfaces 64A and 64B of the abutment 12.

With the lips 23A and 23B operatively positioned in their board restraining position, the ram 34 is actuated, driving the book front engaging surface 35 into contact with the front 8D of the book. Continued downward motion of the ram 34 drives the book 8 downwardly aligning the front edges 8D of the pages of the book parallel to the front edges 4A and 4B of the boards 3A and 3B, thereby squaring the encased book 8 within the boards.

Following the squaring of the book, the ram 34 is elevated and the actuator 29 operated to return the board restraining assemblies 22A and 22B to their outer inoperative positions. Immediately prior to arrival of the board restraining assemblies 22A and 22B at their outer inoperative positions, ends 46—46 of upper bars 36—36 of the parallel motion assemblies 30—30 abut a pair of stops 26—26 which are effective to move downwardly lower bars 37—37 of the parallel motion assemblies 30—30. Downward movement of the lower bars 37—37 causes the lower edges 47—47 thereof to abut stops 17A and 17B formed on bottom portions of the gripping jaw assemblies 20A and 20B pivoting the gripping jaw assemblies to their innermost operative position, and thereby readying the gripping jaws 19A and 19B for gripping the boards of an encased book positioned at the work station 21 during a subsequent squaring cycle. When the gripping jaw assemblies 20A and 20B and the board restraining assemblies 22A and 22B are moving outwardly, clear of the encased book 8 positioned at the work station 21, suitable book transport means 25 remove the squared book from the work station.

*Detailed description*

The frame 10 of the squaring device includes upstanding front and rear walls 51 and 52 which are spanned by spaced parallel vertical cross members 53, 54 and 55 whose opposite ends terminate in fixed connections to the inside surfaces of the front and back walls 51 and 52. Each of the cross members 53–55 is provided with a pair of bearings 56, 57, and 58 which, in combination, form two aligned sets of three bearings each.

The abutment 12 includes a pair of vertical spaced parallel bars 61A and 61B secured to the stationary frame portion 10'. Frame portion 10' may or may not be directly connected to the frame 10, but is in any event stationary with respect thereto. Horizontally extending from, and fixed relative to, the inner surfaces 63A and 63B of the vertical bars 61A and 61B, are ledges 62A and 62B. The lower surfaces 64A and 64B of the ledges 62A and 62B are co-planar, and perpendicular to the bar inner surfaces 63A and 63B. The ledge surfaces 64A and 64B constitute the locating surfaces of the abutment 12 against which the front board edges 4A and 4B of the boards 3A and 3B are adapted to contact for the purpose of locating the backbone edges 5A and 5B of the boards in alignment with the upper surfaces of the lips 23A and 23B. The portion of the surfaces 63A and 63B of the bars 61A and 61B located below the ledges are spaced apart a distance sufficient to snugly embrace the upper exterior marginal portions of the case ends 2A and 2B when the board edges 4A and 4B of an encased book 8 are abutting the locating surfaces 64.

Preferably one of the bars 62A or 62B is horizontally adjustable to accommodate books having different thicknesses; that is, books having different included dimensions between the case ends 2A and 2B. Additionally, the bars 61A and 61B are preferably jointly vertically adjustable to accommodate articles having different included dimensions between the front board edges 4A and 4B and the backbone board edges 5A and 5B. In practice, the locating surface 64 is spaced from the upper surface of the lips a distance equal to the distance between the front and backbone edges of the boards of the encased book to be squared.

The board restraining assembly 22B includes a cross member 70B disposed perpendicularly to the frame front and back walls 51 and 52. The cross member 70B is provided with a pair of threaded openings 71B—71B which are coaxial with the journal bearings 56, 57 and 58. The cross member 70B is mounted for horizontal sliding movement between inner operative and outer inoperative positions by a pair of guide rods 72—72 having intermediate threaded portions 73B which are adapted to threadedly engage the threaded openings 71B—71B formed in the cross member 70B. The guide rods 72—72 are horizontally slidably mounted in the journal bearings 56, 57, and 58 formed in the cross frame members 53, 54, and 55, respectively.

Formed in the cross member 70B is a transversely disposed shoulder 74B defined by a horizontal surface 75B and a vertical surface 76B. Located in and positioned by the shoulder 74B is the board restraining jaw 15B arranged with its lip 23B extending horizontally and inwardly into the work station 21.

A pair of sprockets 77 are secured to the ends of the guide rods 72—72 and interconnected by a closed loop chain 78 for rotating the guide rods about their axis in unison to simultaneously advance or retract the board restraining assembly 22B relative to the work station 21. This adjustment permits the inner limit of travel of the lip 23B to be varied as is necessary when the squaring apparatus is used with books having different thicknesses.

The board restraining assembly 22A includes a C-shaped cross member 70A having parallel journal bearings 71A—71A formed therein which are coaxial with the threaded openings 71B—71B formed in the cross member 70B and with the journal bearings 56, 57, and 58 formed in the cross members 53, 54, and 55. Slidably positioned within the journal bearings 71A—71A in the cross member 70A are the guide rods 72—72 which slidably support the cross member 70A for movement between its inner operative and outer inoperative positions. The cross member 70A is provided with a transverse shoulder 74A defined by horizontal surface 75A and vertical surface 76A. Positioned in the transverse shoulder 74A is the board restraining jaw 15A arranged with its lip 23A extending horizontally and inwardly into the work station 21.

The gripping jaw assembly 20B includes the transversely disposed jaw 19B to which is secured a resilient pad 80B preferably fabricated of rubber and having a ridged inner vertical surface for frictionally gripping the case end 2B of an encased book 8 located at the work station 21. Depending from and preferably integral with the ends of the transverse gripping jaw 19B are a pair of angled legs 82B—82B. Legs 82B have stops 17B secured to and inwardly projecting from the inner surface of the bottom portion thereof. The legs 82B are pivotally mounted to the exterior vertical surfaces of a pair of extensions 84B—84B which project from the outer surface of the cross member 70B by a pair of outwardly projecting pins 85B. Sleeves 50 disposed about the pins 87A and 87B space the legs 82A and 82B from the extensions 90 and 84.

Pivotal movement of the legs 82B and, hence of the jaw 19B and pad 80B, is limited by arcuate slots 86B in the legs which cooperate with pins 87B projecting therethrough. The pins 87B are secured to the vertical outer surfaces of the extensions 84B. In practice the length of the slots 86B in the circumferential direction is sufficient to prevent the pins 87B from abutting the circumferential extremities of the slots when the depending legs 82B are pivoted to their inner operative and outer inoperative positions during a squaring operation.

A pair of compression springs 89B provide a slip friction connection between the legs 82B of the gripping jaw assembly 20B, and nuts 88B secured to the pins 87B. This slip friction connection between legs 82B and nuts 88B provides a slip friction relationship between the lips 23B and the gripping pad 80B by reason of the fixed relationship between the pad, pin 85B, and legs 82B, and between the lip, board restraining jaw 15B, cross member 70B, and extensions 84.

The gripping jaw assembly 20A is a mirror image of the gripping jaw assembly 20B and includes the horizontally disposed gripping jaw 19A provided with a ridged gripping pad 80A, and a pair of depending legs 82A provided with inwardly projecting stops 17A which cooperate with the lower link 37 of the parallel linkage mechanism 30. The legs 82A are mounted for pivotal motion by outwardly projecting pins 85A secured to the exterior surfaces of a pair of extensions 90A—90A projecting normally from and secured to the exterior surface of the cross member 70A.

The pivotal movement of the legs 82A is limited by the combination of a pair of pins 87A outwardly projecting from the exterior vertical surfaces of the extensions 90A and the arcuate slots 86A. Like the slots 86B, the slots 86A preferably are of sufficient length to prevent the pins 87B from abutting the circumferential extremities of the slots as the jaw 19A moves between its inner operative and outer inoperative positions.

A slip friction connection, including pins 87A outwardly projecting from the extensions 90A, nuts 88A secured to pins 87A, and compression springs 89A, is provided. The slip friction connection enables the pivotal gripping jaw assembly 20A to remain stationary relative to the board restraining assembly 22A in whatever position it is placed in the course of a squaring cycle. The slip friction connection enables the pads 80A and 80B to be moved relative to the lips 23A and 23B when the forces of the compression springs 89A and 89B are overcome, and once moved to remain fixed relative to the lips until moved to a new relative position by again overcoming the frictional forces afforded by the spring. The slip connection must have sufficient frictional characteristics to enable gripping jaws 19A and 19B to elevate an encased book 8 gripped therebetween them when the gripping jaw assemblies 20A and 20B are pivoted to their inner operative position as the board restraining assemblies 22A and 22B move from their outer inoperative position to their inner operative position in the course of a squaring cycle.

The actuator 29 includes a double acting piston 28 slideable between stops 91 and 92 in a cylinder 93 secured to the outer surface of the cross member 70A by means of a support bracket 94. A piston rod 95 is secured to the piston 28 and moves in the direction of arrow 96 when the differential across the piston 28 is such as to provide a greater force in the direction of arrow 96, and moves in the direction of arrow 97 when the pressure differential across the piston 28 is such as to provide a resultant force in the direction of arrow 97. A bar 98 secured to the outer end of the piston rod 95 and the guide rods 72 by suitable nuts 99 interconnects the piston 28 and the board restraining assembly 22B. The bar 98 also supports at its ends inwardly projecting adjustable stops 26—26.

Movement of the lip 23B in the direction of arrow 97 is limited by abutment of a collar 112 secured to one of the guide rods 72 and the outer surface of the cross member 53, and in the direction of arrow 96 is limited by abutment of the piston 28 with the stop 91 formed in the cylinder 93. Inward movement of the lip 23A in the direction of arrow 97 is limited by abutment of the inner vertical surface of the cross member 54, and in the direction of arrow 96 is limited by abutment of the piston 28 with the stops 92.

The ram 34 includes a transversely disposed bar 100 having the book front engaging surface 35 disposed parallel to the locating surfaces 64A and 64B formed on the ledges 62A and 62B. The book front engaging surface 35 is preferably arcuate for rounding the pages of the book during the squaring operation. The width of the bar 100 is preferably slightly less than the width or thickness of the encased book 8. The bar 100 is vertically movable between a lower position depicted in FIGURE 5 in which the back 8C of the encased book 8 is urged into contact with the back portion 2C of the case 2, and an upper position depicted in FIGURE 6 in which the lowest portion of the book front contracting surface 35 is above the plane of the locating surfaces 64. A rod 102 is connected at its lower end to the upper surface of the bar 100 and at its upper end to a reciprocator 103, such as a mechanical, hydraulic, pneumatic, electromechanical device. The reciprocator 103 may be provided with a positive stop for limiting the downward motion of the bar 100 to a position such that the back of the book will be driven downwardly until it just contacts the back portion 2C of the case 2. Alternatively, the reciprocator 103 may be designed to permit the bar 100 to exert a predetermined downward force against the front 8D of the book 8 which is of sufficient magnitude to enable the back 8C of the book to move into contact with the back portion 2C of the case 2, and once so moved come to rest.

A parallel motion assembly 30 is mounted adjacent each side wall 51 and 52. Each includes an upper horizontal bar 36 and a lower horizontal bar 37. The bars 36 and 37 are restrained for parallel motion by a pair of links 38 and 39 which are pivotally mounted to the extension 90 of the board restraining assembly 22A by outwardly projecting pins or rods 40 and 41. The links 38 and 39 are also pivotally mounted to the upper bar 36 by pins 42 and 43 and to the lower bar 37 by pins 44 and 45.

The dimensions of the parallel motion mechanism 30—30 are selected such that when the board restraining assembly 22B moves to its outer limit of travel in the direction of arrow 97, the stops 26—26 projecting horizontally from the ends of the bar 98 abut and move in the direction of arrow 97 the ends 46—46 of upper bars 36—36 a distance sufficient to lower the bars 37—37 such that their lower edges 47—47 abut and move downwardly the stops 17A and 17B on the legs 82A and 82B sufficiently to pivot the legs clockwise and counterclockwise, respectively, about their pins 85A and 85B to move the ridged inner surfaces of the gripping pads 80A and 80B to their inner inoperative positions inboard of the lips 23A and 23B.

An important feature of the parallel link mechanism 30 of this invention is that regardless of the thickness of the encased book 8 that the apparatus is set to square, and, hence, regardless of the position of the lip 23B with respect to the lip 23A, the bars 37—37 pivot the arms 82B—82B the same angular increment, locating the ridged surface of the pad 80B the same lateral distance inboard of the lip 23B for a predetermined movement of bars 36—36 in the direction of arrow 97. The importance of this feature is that the apparatus can be adjusted to square different thickness books by merely rotating the sprockets 77 to advance or retract the cross member 70B relative to the threaded portions 73—73 of the guide rods 72—72, no further adjustments being necessary providing the thickness of the boards does not appreciably change.

A book support 27 is stationarily mounted in the work station 21. The support 27 is disposed parallel to the lips 23A and 23B, and is adapted to receive the back of an encased book transported to the work station 21, supporting the book in a generally vertical position as depicted in FIGURE 6.

The book transport mechanism 25 for delivering and withdrawing books from the work station 21 may be of any suitable design. Preferably the book transport mechanism includes a pair of actuators 25A and 25B which are mounted for movement parallel to the lips 23A and 23B. The actuators 25A and 25B are provided with plungers 110A and 110B which are selectively shiftable into gripping relation with the case ends 2A and 2B of a book, for gripping a book and either delivering it to the work station 21 or removing it from the work station in response to transverse movement of the actuators 25A and 25B parallel to lips 23A and 23B.

The plunger 110B is preferably driven and positively stopped at a point in its travel in the direction of arrow 96 sufficient to enable the plunger 110B to grip the case end 2B of a case 2 when transfer of a book to or from the work station 21 is required. The plunger 110A is preferably spring biased against the case end 2A. Any suitable means may be provided for reciprocating the plunger actuators 25A and 25B parallel to the lip edges 23A and 23B, and reciprocating the plungers 110A and 110B toward each other for gripping the case ends 2A and 2B when it is desired to transfer books to and from the work station 21.

*Operation*

For the purpose of describing the operation of the squaring apparatus of this invention it is assumed that the squaring apparatus, at the start of the squaring cycle, is positioned as depicted in FIGURE 7. Specifically, it is assumed that the squaring cycle commences upon the delivery to the work station 21 of a case 2 having a book 8 inserted therein with the outer surfaces of the end sheets 7A and 7B freshly glued, such as results when an encased book is delivered from a casing-in machine. Upon delivery of an encased book 8 at the work station 21 the back 2C of the case 2 is in contact with the upper surface of the book support 27, and the upper outer marginal portions of the case ends 2A and 2B are located adjacent to the surfaces 63A and 63B of the bars 61A and 61B located below the ledges 62A and 62B. Additionally, the upper edges 4A and 4B of the boards 3A and 3B are slightly below the locating surfaces 64A and 64B of the ledges 62A and 62B of the abutment 12. The plungers 110A and 110B which, during the delivery of the book to the work station 21 are urged toward each other into gripping relation with the case ends 2A and 2B, are in their retracted position. The bar 100 of the ram 34 is elevated with the book front engaging surface 35 above the plane of the locating surfaces 64A and 64B.

The lips 23B and 23A are in their outer inoperative positions established by engagement of the collar 112 with the exterior surface of the cross member 53 and engagement of the piston 28 with the stops 92, respectively. The gripping pads 80A and 80B are in their outer inoperative positions by reason of the arms 82A and 82B having pivoted clockwise and counterclockwise, respectively, about pins 85A and 85B, respectively, as a consequence of the lower edges 47—47 of the bars 37—37 abutting the stops 17A and 17B when the ends 46—46 of the upper bars 36—36 are shifted in the direction of arrow 97 upon engagement of the stops 26—26 secured to the ends of the bar 98.

The squaring cycle is initiated by producing a pressure differential across the piston 28 in a direction such that a resultant force is applied to the piston in a direction tending to move the rod 95 out of the cylinder 93 in the direction of arrow 96. As the piston 28 moves relatively toward the stop 91 the cross members 70A and 70B of the board restraining assembly 22A and 22B move a corresponding distance relative to each other by reason of the interconnecting piston rod 95, bar 98, guide rods 72—72 and cylinder support 94 which connect the piston and cylinder to the transverse members 70B and 70A, respectively.

Movement of the transverse members 70A and 70B inwardly toward each other from their outer inoperative position to their inner operative position also moves the jaw assemblies 20A and 20B which are carried by the members 70A and 70B via the pins 85A and 85B. When the relatively moving gripper jaw assemblies 20A and 20B reach the position depicted in FIGURE 8 the ridged inner surfaces of the gripper pads 80A and 80B contact the case ends 2A and 2B, gripping encased book 8. Continued movement of the piston 28 toward the stop 91 from the position shown in FIGURE 8 advances the board restraining assemblies 22A and 22B and the gripper jaw assemblies 20A and 20B to the position shown in FIGURE 5. As the gripper jaw assemblies 20A and 20B including jaws 19A and 19B advance from the position shown in FIGURE 8 to the position shown in FIGURE 5, the encased and gripped book 8 resists further inward movement of the jaws 19A and 19B, causing the legs 82A and 82B to overcome the friction afforded by springs 89A and 89B and pivot counterclockwise and clockwise, respectively, about their mounting pins 85A and 85B. Pivotal movement of the legs 82A and 82B causes the gripping pads 80A and 80B to move relative to the cross members 70A and 70B through an arc centered on the pins 85A and 85B. This arcuate movement of the gripping pads 80A and 80B causes the pads to elevate which, in turn, raises the boards 3A and 3B gripped therebetween into the position shown in FIGURE 5 wherein the front board edges 4A and 4B are in contact with the locating surfaces 64A and 64B of the ledges 62A and 62B of abutment 12. With the board edges 4A and 4B so positioned the board backbone edges 5A and 5B are aligned with the upper surfaces of the lips 23A and 23B.

Concurrently with the arcuate movement of the grip pads 80A and 80B relative to the pins 85A and 85B and the consequent elevation of the board edges 4A and 4B into contact with the locating surfaces 64A and 64B of the abutment 12, the lips 23A and 23B move into the hinges 9A and 9B to their inner operative position shown in FIGURES 5 and 5A with the lip 23A adjacent and beneath the board backbone edges 5A and 5B. Since the function of the lips 23A and 23B when in their inner operative position depicted in FIGURE 5A is only to apply a restraining force to the boards 3A and 3B in a direction such as to maintain the board front edges 4A and 4B in contact with the locating surfaces 64A and 64B, the lips 23A and 23B need only project slightly beyond the outer surfaces of the boards. Projection of the lips 23A and 23B further into the hinges 9A and 9B may result in damage to the hinge portions of the case 2 and/or book 8.

When the lips 23A and 23B have been positioned in their inner operative positions depicted in FIGURES 5 and 5A, the ram 34 is actuated. Specifically, the reciprocator 103 is operated to reciprocate the rod 102 downwardly, urging the book front contacting surface 35 of the transverse bar 100 into contact with the book front 8D. Continued movement of the bar 100 subsequent to initial contacting of the book front 8D by the book engaging surface 35 is effective to drive the encased book 8 downwardly relative to the boards 3A and 3B which are prevented from moving downwardly by the lips 23A and 23B which apply restraining forces to the backbone edges 5A and 5B of the boards.

If a positive stop is associated with the reciprocator 103, the bar 100 is driven down a predetermined distance depending on the dimensions of the book until the back 8C of the book 8 is in contact with the back 2C of the case 2. When the back 8C of the book 8 and the back 2C of the case 2 are in contact, the reciprocator 103 is operated to withdraw the rod 102 and raise the bar 100 to its operative position with the book front engaging surface 35 above the plane of the locating surfaces 64A and 64B of abutment 12.

If a positive stop is not associated with the reciprocator 103, the bar 100 is driven downwardly by a predetermined bias force until the back 8C of the book 8 comes into contact with the back 2C of the case, whereupon further downward travel of the encased book 8 is resisted and the bias force operating the bar 100 overcome. Thereafter, the actuator 103 is operated to withdraw the bar 100 to its inoperative position.

In the course of the downward travel of the bar 100 the front edges 8D of the sheets of the book 8 assume the contour of the book front engaging surface 35 of the bar 100, becoming differentially positioned in the vertical direction, thereby assuming the rounded configuration depicted in FIGURE 5. Additionally, in the course of the downward travel of the bar 100 any anti-parallelism between the front edges 8D and end sheets 7A and 7B of the encased book 8 relative to the front edges 4A and 4B of the boards 3A and 3B is eliminated. The resultant parallel disposition of the front edges 4A and 4B of the sheets of the book 8, including end sheets 7A and 7B, with respect to the board front edges 4A and 4B is produced by reason of the parallel disposition of the book front engaging surface 35 with respect to the lips 23A and 23B which restrain downward movement of the boards 3A and 3B during the squaring operation.

When the encased book 8 has been properly squared within the boards 3A and 3B and the bar 100 elevated to its inoperative position with the book front engaging surface 35 above the plane of the locating surfaces 64A and 64B of the abutment 12, fluid is introduced into the cylinder 93 in a manner such as to produce a resultant force on the piston 28 in the direction of arrow 97, causing the piston 28 to advance relatively toward the stops 92. As the piston 28 advances relatively toward the stops 92 the cross members 70A and 70B of the board restraining assemblies 22A and 22B are urged apart from their inner operative positions shown in FIGURE 5 toward their outer inoperative positions shown in FIGURE 7. This outward movement of the board restraining assemblies 22A and 22B continues until the piston 28 bottoms against the stop 92 and the collar 112 abuts the outer surface of the cross member 53, which define the outer limits of travel of the board restraining assemblies 22B and 22A, respectively. A pair of tension spring 115—115 secured to frame cross member 53 and bar 98 assist in this outward movement of the board restraining assemblies 22A and 22B.

Outward movement of the board restraining assemblies 22A and 22B from the position shown in FIGURE 5 to the position shown in FIGURE 7 is effective to outwardly position the gripper jaw assemblies 20A and 20B. As the board restraining assemblies 22A and 22B move outwardly from their inner operative positions depicted in FIGURE 5 to their outer inoperative positions depicted in FIGURE 7, the legs 82A and 82B move outwardly away from the case ends 2A and 2B. The angular orientation of the legs 82A and 82B about their pivot pins 85A and 85B during their initial outward movement does not change by reason of the friction connection provided by the springs 89A and 89B. This enables the gripper jaws 19A and 19B to release the encased book 8 immediately following initiation of outward movement of the board restraining assemblies 22A and 22B, permitting a squared book to be transported from the work station 21 without unnecessary delay following the squaring cycle.

As the board restraining assemblies 22A and 22B approach their outer limit of travel, the ends 46—46 of the bars 36—36 which are carried by the gripping jaw assembly 22A, abut the stops 26—26 secured to the ends of the bar 98. Further movement of the board restraining assemblies 22A and 22B following abutment of the stops 26—26 with the ends 46—46 of bars 36—36 causes the links 38—38 and 39—39 to rotate clockwise about their pivot pins 40 and 41, in turn, lowering the bar 37—37. In the course of lowering the bars 37—37 the lower edges 47—47 thereof abut the stops 17A and 17B projecting from the inner surfaces of the lower portions of the legs 82A and 82B as shown in FIGURE 6, pivoting the legs clockwise and counterclockwise, respectively, about their pivot pins 85A and 85B. This returns the gripper jaws 19A and 19B and the pads 80A and 80B to their inner inoperative positions depicted in FIGURE 7, thereby readying the gripping jaw assemblies 20A and 20B for the next squaring cycle.

While the board restraining assemblies 22A and 22B and the gripping jaw assemblies 20A and 20B are being returned to their inoperative positions depicted in FIGURE 7, from their operative positions depicted in FIGURE 5 following the completion of the squaring of an encased book 8 within the boards 3A and 3B, the plunger 110B is advanced inwardly into gripping relation with one case end of the encased book as shown in FIGURE 6. The spring biased plunger 110A grips the other case end of the encased book. Following this, the plungers 110A and 110B are moved transversely by actuators 25A and 25B in a direction parallel to the lips 23A and 23B to remove the squared book from the work station 21. Thereafter, a new, freshly glued, but unsquared encased book, is delivered to the work station 21 to be squared.

Delivery of the freshly glued, but unsquared, book to the work station 21 may be accomplished by the plungers 110A and 110B by transversely shifting them to the output end of the casing-in machine where they grip the freshly glued, but unsquared, book and deliver it to the work station 21. Alternatively, and preferably, two sets (only one shown) of plungers 110A and 110B are provided, one set being operative to remove a squared book from the work station 21 while the other set is simultaneously delivers to the work station a freshly glued, but unsquared, book.

Having described my invention, I claim:

1. Apparatus for squarely positioning a book between the boards of a case comprising:
   an abutment having a locating surface engageable with the front edges of said boards,
   a board holder for holding said boards with their front edges in contact with said abutment locating surface, and
   a ram having a book engaging surface disposed parallel to said abutment locating surface, said ram being movable away from said abutment locating surface toward the back of said book for positioning said book within said case with the front book edges parallel to the front board edges.

2. Apparatus for positioning a book between the boards of a case comprising:
an abutment having a locating surface engageable with the front edges of said boards,
a board positioner for positioning said front board edges against said locating surface of said abutment,
a board restrainer for maintaining said front board edges against said locating surface of said abutment once so positioned by said board positioner, and
a ram having a book engaging surface disposed parallel to said abutment locating surface, said ram being moving away from said abutment locating surface toward the back of said book for positioning said book within said case with the front book edges parallel to the front board edges.

3. The apparatus of claim 2 wherein said board positioner includes first and second gripping jaws each engageable with the outer surface of said case adjacent different ones of said boards, said jaws being mounted for relative movement toward each other and toward said abutment locating surface for simultaneously gripping said boards and moving the front edges thereof against said abutment locating surface.

4. The apparatus of claim 3 wherein said board restrainer includes first and second position maintaining jaws mounted for movement to a board restraining position wherein said position maintaining jaws are each in abutting relationship to different ones of the backbone edges of boards properly positioned with their front edges against said abutment locating surface for preventing said boards from moving away from said abutment locating surface when said ram moves said book toward the back of said case.

5. The apparatus of claim 4 wherein said first and second gripping jaws are respectively mounted to said first and second position maintaining jaws for gripping their associated outer case surface and moving said front board edges against said abutment locating surface concurrently with the movement of said position maintaining jaws into abutting relationship with said backbone board edges.

6. The apparatus of claim 5 wherein said position maintaining jaws are mounted for movement in a direction substantially normal to said ram movement between an inner position abutting said backbone board edge and an outer position, and wherein said first and second gripping jaws are respectively pivotally mounted on said first and second position maintaining jaws for limited pivotal movement simultaneously with movement of said position maintaining jaws toward each other, said pivotal movement being between initial positions wherein said gripping jaws are inboard of their associated position maintaining jaws and gripping positions wherein said gripping jaws are both outboard of their associated position maintaining jaws and spaced more closely to said abutment locating surface.

7. The apparatus of claim 6 further including friction means interconnecting said pivotal gripping jaws and said position maintaining jaws for restraining pivotal movement of said gripping jaws when said position maintaining jaws move apart thereby preventing said gripping jaws from moving said front edges of said boards away from said abutment locating surface as said position maintaining jaws move apart at the completion of a book squaring cycle.

8. The apparatus of claim 7 further including a parallel link mechanism mounted on said first position maintaining jaw and having first and second parallel links, said first link adapted to contact first and second stops formed respectively on said first and second pivotal gripping jaws for pivoting said gripping jaws to their initial positions in response to abutment of said second link against a relatively stationary stop as said first position maintaining jaw moves toward its outer position.

9. The apparatus of claim 8 further including:
a frame having a first bearing fixed thereto,
a second bearing fixed to one of said first and second position maintaining jaws,
a rigid member fixed to the other of said first and second position maintaining jaws and engageable with said first and second bearings for supporting said position maintaining jaws, and
actuator means interconnecting said rigid member and said one position maintaining jaw for moving said position maintaining jaws relative to each other and independent of said frame whereby said position maintaining jaws float as they move into their respective inner positions.

10. Apparatus for squarely positioning a book between the boards of a case comprising:
an abutment having a locating surface adapted to be contacted by the front edges of the boards of a case to thereby locate the backbone edges of the boards at a predetermined reference position,
positioning means for positioning said front edges of said boards against said locating surface for locating said backbone case edges at said predetermined reference position,
restraining means movable to said reference position for holding the backbone edges of boards whose front edges are in contact with said locating surface at said predetermined reference position, and
ram means having a book front engaging surface disposed parallel to said reference position movable toward said predetermined reference position for positioning a book squarely relative to said held boards having their front edges in contact with said locating surface and between which said book is sandwiched.

11. The apparatus of claim 10, wherein said book front engaging surface of said ram is curved for rounding the pages of a book as said ram moves a book positioned between said held boards toward said predetermined reference position.

12. A method of squarely positioning a book between the boards of a case comprising the steps of:
moving the front edges of the boards of a case between which a book is positioned into contact with a locating surface disposed perpendicularly to said boards,
maintaining said front board edges in contact with said locating surface, and
urging the front of said book in a direction opposite to the direction of movement of said book during the moving step, said urging and said maintaining steps being concurrent with each other and subsequent to said moving step.

13. The method of claim 12 wherein said moving step includes simultaneously urging said covers toward each other and toward said locating surface.

14. The method of claim 12 wherein said maintaining step includes applying a restraining force to said backbone board edges in a direction toward said locating surface.

15. The method of claim 14 wherein said moving step includes simultaneously urging said covers toward each other and toward said locating surface.

References Cited

UNITED STATES PATENTS

| | | |
|---|---|---|
| 2,636,195 | 4/1953 | Hicks et al. |
| 2,921,322 | 1/1960 | Crawley et al. |
| 3,016,550 | 1/1962 | Schramm. |
| 3,123,848 | 3/1964 | Smith et al. _____ 11—3 X |

LAWRENCE CHARLES, *Primary Examiner.*

U.S. Cl. X.R.

11—1